(12) United States Patent
Ishida (10) Patent No.: US 8,740,510 B2
(45) Date of Patent: Jun. 3, 2014

(54) CUTTING INSERT AND CUTTING TOOL, AND CUTTING METHOD USING THE SAME

(75) Inventor: Takuya Ishida, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 1255 days.

(21) Appl. No.: 12/597,706

(22) PCT Filed: Apr. 25, 2008

(86) PCT No.: PCT/JP2008/058103
§ 371 (c)(1),
(2), (4) Date: Oct. 26, 2009

(87) PCT Pub. No.: WO2008/136426
PCT Pub. Date: Nov. 13, 2008

(65) Prior Publication Data
US 2010/0092253 A1      Apr. 15, 2010

(30) Foreign Application Priority Data

Apr. 26, 2007  (JP) .................. 2007-116902

(51) Int. Cl.
*B23C 5/20*     (2006.01)

(52) U.S. Cl.
USPC ........................................ 407/61; 407/113

(58) Field of Classification Search
USPC ............ 407/113–116, 30, 33, 35, 42, 47, 48, 407/66, 67, 61
IPC ....................................................... B23B 5/20
See application file for complete search history.

(56) References Cited

U.S. PATENT DOCUMENTS

| 3,636,602 | A | * | 1/1972 | Owen | 407/113 |
| 4,068,976 | A | * | 1/1978 | Friedline | 407/114 |
| 4,681,486 | A | * | 7/1987 | Hale | 407/114 |

(Continued)

FOREIGN PATENT DOCUMENTS

| GB | 2054427 A | * | 2/1981 |
| JP | 07-237025 | | 9/1995 |

(Continued)

OTHER PUBLICATIONS

German language office action dated Oct. 30, 2012 and its English language translation issued in corresponding German application 112008001089.7.

(Continued)

*Primary Examiner* — Andrea Wellington
*Assistant Examiner* — Sara Addisu
(74) *Attorney, Agent, or Firm* — DLA Piper LLP (US)

(57) ABSTRACT

A cutting insert includes an upper surface, a lower surface, a side surface, a cutting edge, and a groove portion. The cutting edge includes a main cutting edge, an auxiliary cutting edge arranged so as to make an obtuse angle to the main cutting edge in the upper surface view, and a corner cutting edge positioned between the main cutting edge and the auxiliary cutting edge and is located in at least a part of an intersection portion between the upper surface and the side surface. The groove portion is located on the side surface so as to reach the upper surface. In this cutting insert, a side wall surface of the groove portion positioned on the side near the corner cutting edge is substantially parallel to the auxiliary cutting edge or comes close to the auxiliary cutting edge toward inside of the groove portion in the upper surface view.

18 Claims, 6 Drawing Sheets

(56) References Cited

U.S. PATENT DOCUMENTS

| | | | |
|---|---|---|---|
| 5,085,542 A * | 2/1992 | Nakayama et al. | 407/114 |
| 5,221,164 A * | 6/1993 | Allaire | 407/113 |
| 5,549,424 A * | 8/1996 | Bernadic et al. | 407/100 |
| 5,688,083 A * | 11/1997 | Boianjiu | 408/224 |
| 5,779,401 A * | 7/1998 | Stallwitz et al. | 407/114 |
| 5,791,832 A * | 8/1998 | Yamayose | 407/113 |
| 5,921,721 A * | 7/1999 | Hintze et al. | 407/113 |
| 5,947,650 A * | 9/1999 | Satran et al. | 407/113 |
| 6,238,146 B1 * | 5/2001 | Satran et al. | 407/113 |
| 6,447,218 B1 * | 9/2002 | Lagerberg | 407/114 |
| 6,884,006 B2 * | 4/2005 | Nagashima | 407/34 |
| 6,957,933 B2 * | 10/2005 | Pachao-Morbitzer et al. | 407/11 |
| 6,957,935 B2 * | 10/2005 | Sung et al. | 407/113 |
| 7,591,614 B2 * | 9/2009 | Craig | 407/66 |
| 7,802,946 B2 | 9/2010 | Ishida | |
| 8,025,465 B2 * | 9/2011 | Ishida | 407/114 |
| 8,113,746 B2 * | 2/2012 | Koga | 407/113 |
| 8,337,123 B2 * | 12/2012 | Ishida | 407/42 |
| 2010/0247252 A1 * | 9/2010 | Hatta | 407/42 |
| 2011/0081209 A1 * | 4/2011 | Engstrom | 407/40 |

FOREIGN PATENT DOCUMENTS

| | | | |
|---|---|---|---|
| JP | 07-237026 | | 9/1995 |
| JP | 07-299636 | | 11/1995 |
| JP | 09-117817 | | 5/1997 |
| JP | 2003025135 A | | 1/2003 |
| JP | 2006218617 A | * | 8/2006 |
| JP | 2007-083381 | | 4/2007 |
| WO | 2006035910 A1 | | 4/2006 |

OTHER PUBLICATIONS

Chinese language office action dated Aug. 12, 2010 and its English language translation for corresponding Chinese application 200880013452.6.

* cited by examiner

CUTTING INSERT AND CUTTING TOOL, AND CUTTING METHOD USING THE SAME

CROSS-REFERENCE TO THE RELATED APPLICATIONS

This application is a national stage of international application No. PCT/JP2008/058103, filed on Apr. 25, 2008, which also claims the benefit of priority under 35 USC 119 to Japanese Patent Application No. 2007-116902, filed on Apr. 26, 2007, the entire contents of which are incorporated herein by reference.

TECHNICAL FIELD

The present invention relates to a cutting insert used for a cutting tool, and a cutting tool in which this cutting insert is installed, and a cutting method using the same.

BACKGROUND ART

Conventionally, a cutting tool such as a face mill and an end mill, particularly an economically excellent throw-away type cutting tool in which a cutting insert is installed in a holder for use is used in many cases.

For example, Patent Document 1 discloses a cutting insert in which a rake face makes a positive rake angle relative to a main cutting edge in a state that the cutting insert is installed in a holder and the main cutting edge is divided by a groove portion extending substantially perpendicular to the main cutting edge in a top view. Such a cutting insert discharges a great deal of chip and is used mainly for heavy cutting with large cutting resistance at the time of cutting. In this case, since the main cutting edge is formed by a plurality of separate main cutting edges divided by the groove portion, the chip finely divided in the width direction is discharged. In such a way, since the discharged chip is finely divided in the width direction, it is possible to reduce the cutting resistance at the time of cutting. As a result, it is possible to reduce chatter vibration during the work.

However, in the cutting insert described in Patent Document 1, the groove portion extends substantially perpendicular to the main cutting edge in a top view. Therefore, in a case where the cutting insert is used while being attached to the holder so that the main cutting edge is inclined relative to a holder axis as in the face mill and the like, a non-cutting portion (an uncut portion) passing through the groove portion at the time of cutting is brought in interference with the cutting insert. Therefore, friction resistance is generated, and hence there is a problem that the cutting resistance at the time of cutting is increased.

Patent Document 1: Japanese Unexamined Patent Application Publication No. 07-299636

DISCLOSURE OF THE INVENTION

Problem to be Solved by the Invention

An object of the present invention is to provide a cutting insert capable of decreasing interference with a non-cutting portion so as to reduce cutting resistance and showing excellent cutting performance even in heavy cutting and a cutting tool, and a cutting method using the same.

Means for Solving the Problems

A cutting insert of the present invention comprises an upper surface, a lower surface, a side surface, a cutting edge, groove portion. The cutting edge comprises a main cutting edge, an auxiliary cutting edge arranged so as to make an obtuse angle to the main cutting edge in the upper surface view, and a corner cutting edge positioned between the main cutting edge and the auxiliary cutting edge and is located in at least a part of an intersection portion between the upper surface and the side surface. The groove portion is located on the side surface so as to reach the upper surface. A side wall surface of the groove portion positioned on the side of the corner cutting edge is substantially parallel to the auxiliary cutting edge or comes close to the auxiliary cutting edge toward inside of the groove portion in the upper surface view.

A cutting tool of the present invention comprises a holder, and the cutting insert installed in a front end of the holder, in which the auxiliary cutting edge of the cutting insert is positioned substantially perpendicular to an axis of the holder.

A cutting method of a work material of the present invention comprises the following (i) to (iii):

(i) rotating at least one of the cutting tool and the work material so as to bring the work material and the cutting tool close to each other;

(ii) bringing the cutting edge of the cutting tool into contact with a surface of the work material so as to cut the work material; and (iii) detaching the cutting tool from the work material.

Effect of the Invention

According to the present invention, it is possible to reduce a thickness of generated chip and decrease a width of the chip, and also reduce the interference between the non-cutting portion and the cutting insert. Therefore, it is possible to reduce the cutting resistance acting at the time of cutting and exert excellent cutting performance even under more strict cutting conditions.

BRIEF DESCRIPTION OF THE DRAWINGS

FIG. 3 (*a*) is a side view of the cutting insert shown in FIG. 1; and FIG. 3(*b*) is a bottom view thereof.

FIGS. 6(*a*) to (*c*) are schematically illustrative views showing a cutting method according to one embodiment of the present invention.

PREFERRED EMBODIMENTS FOR CARRYING OUT THE INVENTION

Cutting Insert

Figure 1:
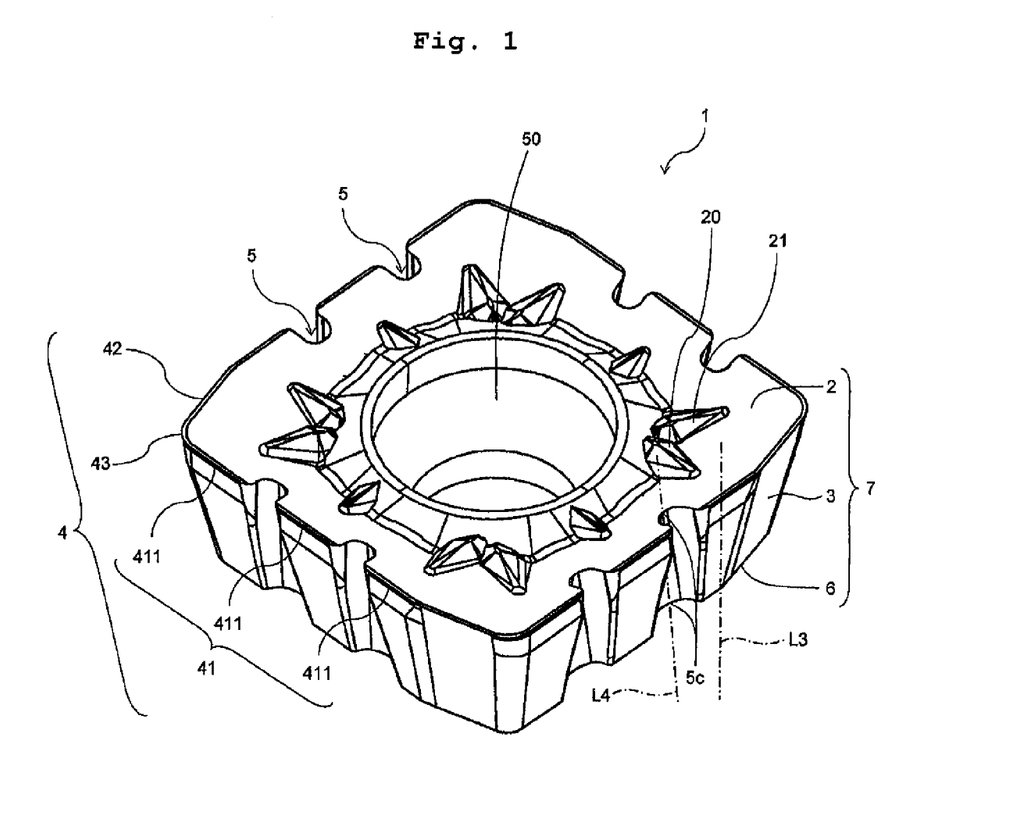
FIG. 1 is a perspective view showing a cutting insert according to one embodiment of the present invention.
Figure 2:
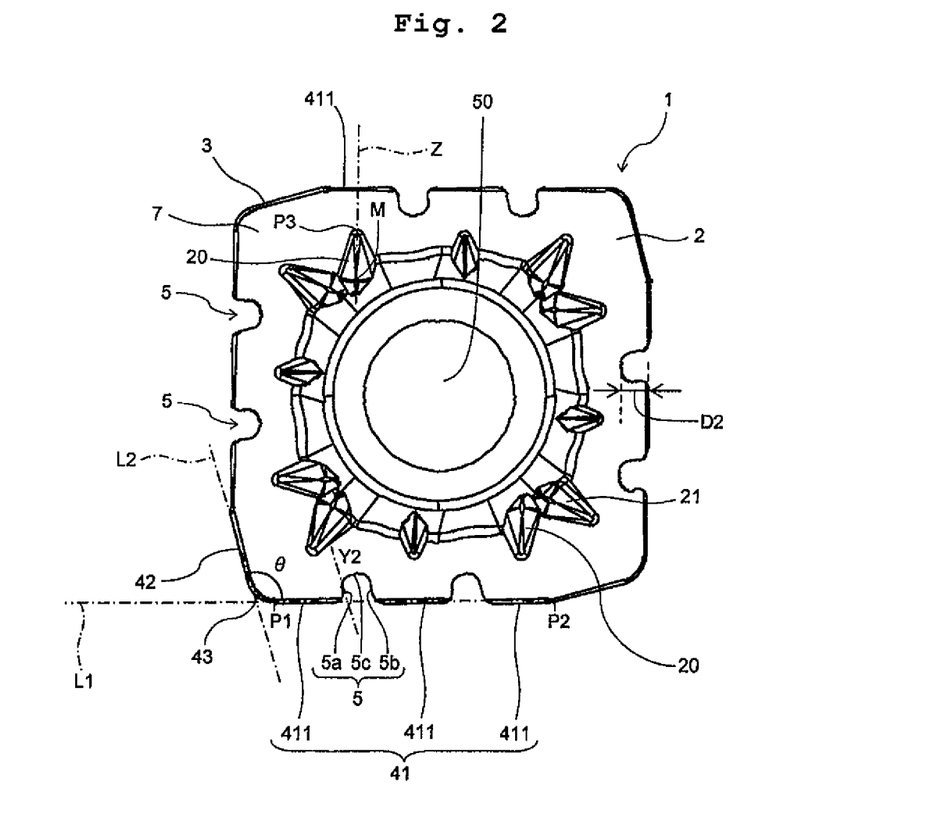
FIG. 2 is a plan view of the cutting insert shown in FIG. 1.
Figure 3:
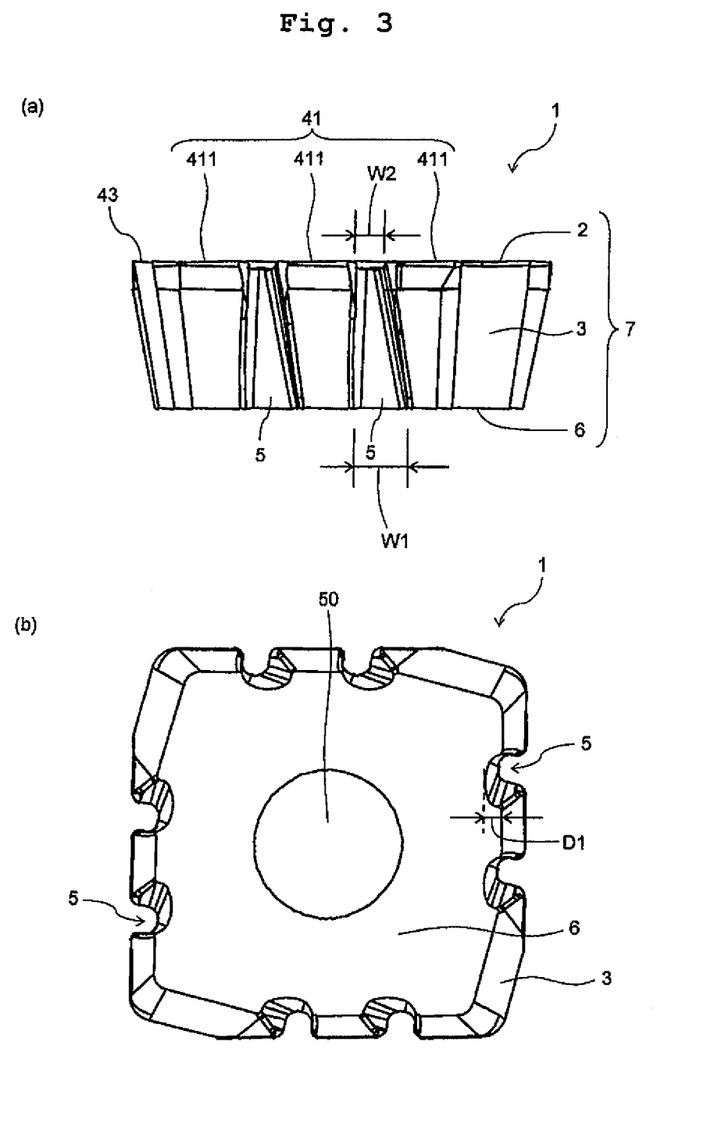

Hereinafter, one embodiment of a cutting insert (hereinafter, referred to as an insert) according to the present invention will be described in detail with reference to FIGS. 1 to 4. As shown in FIGS. 1 to 3, an insert 1 of the present embodiment comprises a main body 7 comprising an upper surface 2, a side surface 3 and a lower surface 6. The main body 7 comprises a cutting edge 4 located in at least a part of an intersection portion between the upper surface 2 and the side surface 3 and a groove portion 5 located on the side surface 3 so as to reach the upper surface 2. The upper surface 2 of the main body 7 functions as a rake face (hereinafter, referred to as the rake face 2), and the side surface 3 of the main body 7 functions as a flank (hereinafter, referred to as the flank 3). Therefore, the cutting edge 4 is located in at least a part of the intersection portion between the rake face 2 and the flank 3, and the groove portion 5 is located on the flank 3 and reaches the rake face 2.

The cutting edge 4 has a main cutting edge 41, an auxiliary cutting edge 42 arranged so as to make an obtuse angle to the main cutting edge 91 in the upper surface view, and a corner cutting edge 43 positioned between the main cutting edge 41 and the auxiliary cutting edge 42. The corner cutting edge 43 connects the main cutting edge 41 and the auxiliary cutting edge 42.

Here, arranging the main cutting edge 41 and the auxiliary cutting edge 42 so as to make an obtuse angle in the upper surface view means that an angle 0 between a hypothetical extension line L1 extending the main cutting edge 41 and a hypothetical extension line L2 extending the auxiliary cutting edge 42 is an obtuse angle. It should be noted that here, the hypothetical extension line L1 of the mail cutting edge 41 is a straight hypothetical extension line obtained by connecting one end P1 of the main cutting edge 41 with the other end P2. The hypothetical extension line L2 of the auxiliary cutting edge 42 is regulated as well as the hypothetical extension line L1 of the mail cutting edge 41. That is, in the present embodiment, the mail cutting edge 41 and the auxiliary cutting edge 42 are respectively arranged so that the angle 0 between the hypothetical extension line L1 and the hypothetical extension line L2 is an obtuse angle. The angle 0 may be 90 to 135 degrees.

The main body 7 has a polygonal plate shape, more specifically a square plate shape. A through hole 50 passing from a center part of the rake face 2 through to the lower surface 6 is formed in the main body 7 having a square plate shape. This through hole 50 is to insert a fixing screw 51 for fixing the insert 1 to a holder 11 described later. The insert 1 has rotational symmetries through 90 degrees relative to a center axis of the through hole 50. Therefore, the main body 7 has four main cutting edges 41, four auxiliary cutting edges 42 and four corner cutting edges 43. That is, the insert 1 can be applied to a four-corner specification and is economically excellent.

A plurality of the groove portions 5 are aligned on the flank 3. The groove portions 5 reach the rake face 2. Therefore, the main cutting edge 41 is divided into a plurality of separate main cutting edges 411 by the groove portions 5. Specifically, in the present embodiment, two groove portions 5 are formed for one main cutting edge 41, and one main cutting edge 41 is divided into three separate main cutting edges 411.

Here, the groove portion 5 is formed so as to extend from the flank 3 toward the inner side of the main body 7 in the upper surface view. The groove portion 5 comprises side wall surfaces 5a and 5b facing each other, and a bottom surface 5c positioned between the side wall surfaces 5a and 5b. The side wall surfaces 5a and 5b and the bottom surface 5c are surfaces extending in the thickness direction of the insert 1.

The side wall surface 5a positioned on the side near the corner cutting edge 43 among the side wall surfaces 5a and 5b is arranged so as to be substantially parallel to the auxiliary cutting edge 42 in the upper surface view. By such a configuration, even with the insert installed in the holder so as to make an peripheral cutting edge angle, it is possible to reduce interference between a non-cutting portion and the insert. Therefore, chip is divided in the width direction so as to reduce cutting resistance. In addition, since the generated chip has small width, it is possible to improve a chip discharging property.

Making the side wall surface 5a of the groove portion 5 substantially parallel to the auxiliary cutting edge 42 means that both are essentially parallel to each other. That is, although depending on a size of the insert 1, the side wall surface 5a of the groove portion 5 may be inclined by 0 to 2 degrees relative to the auxiliary cutting edge 42. In such a case, it is also possible to obtain the same effect as above.

Figure 4:
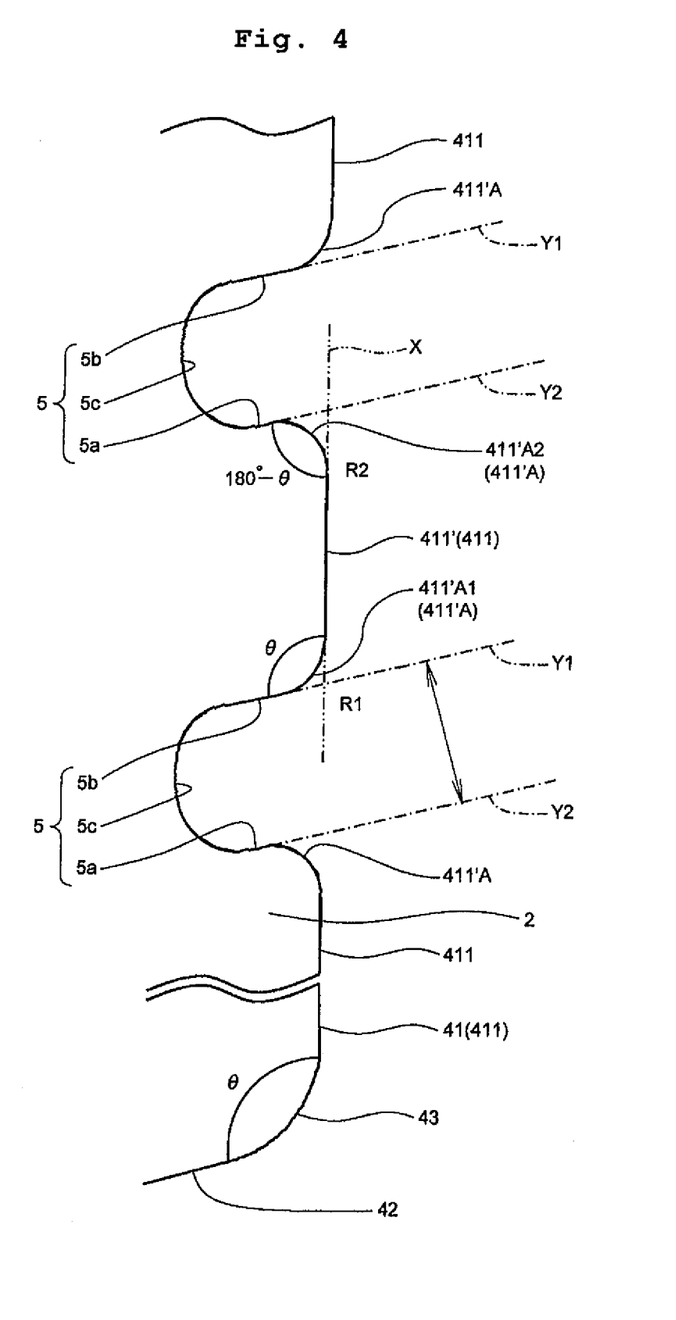
FIG. 4 is a partially enlarged view showing the vicinity of a groove portion of the cutting insert shown in FIG. 2.

More specifically, making the side wall surface 5a of the groove portion 5 substantially parallel to the auxiliary cutting edge 42 in the upper surface view means that as shown in FIG. 4, a hypothetical extension line Y2 which is a straight part among an intersection edge line between the side wall surface 5a of the groove portion 5 and the rake face 2 is substantially parallel to the auxiliary cutting edge 42. It should be noted that in a case where the side wall surface 5a is a curved surface, a tangent line at a connection point between a curved cutting edge portion 411'A at an end of the separate main cutting edge 411 and the side wall surface 5a in the upper surface view can be the hypothetical extension line Y2.

Meanwhile, the side wall surface 5b facing the side wall surface 5a is substantially parallel to the auxiliary cutting edge 42 in the upper surface view. That is, in the present embodiment, the side wall surfaces 5a and 5b are substantially parallel to each other. Thereby, strength of the main body 7 is improved.

It should be noted that making the side wall surface 5b substantially parallel to the auxiliary cutting edge 42 in the upper surface view means that a hypothetical extension line Y1 which is a straight part among an intersection edge line between the side wall surface 5b and the rake face 2 is substantially parallel to the auxiliary cutting edge 42. That is, the side wall surface 5b of the groove portion 5 may be inclined by 0 to 2 degrees relative to the auxiliary cutting edge 42. Other configurations are regulated as well as a case where the side wall surface 5a is substantially parallel to the auxiliary cutting edge 42.

The side wall surfaces of a plurality of the groove portions 5 formed so as to divide the main cutting edge 41 are substantially parallel to each other. Thereby, the discharging direction of the generated chip is fixed, the chip discharging direction can be stabilized and the chip discharging property is improved. It should be noted that making the side wall surfaces of the groove portions 5 substantially parallel to each other means that the side wall surfaces 5a of the groove portions 5 are substantially parallel to each other and the side wall surfaces 5b of the groove portions are substantially parallel to each other. Here, one side wall surface 5a of the groove portion 5 may be inclined by 0 to 2 degrees relative to the other side wall surfaces 5a, and one side wall surface 5b of the groove portion 5 may be inclined by 0 to 2 degrees relative to the other side wall surfaces 5b.

As shown in FIG. 4, among a plurality of the separate main cutting edges 411 forming the main cutting edge 41, the separate main cutting edge 411' connects to the groove portions 5 on both ends respectively. The separate main cutting edge 411' comprises curved cutting edge portions 411'A and 411'A on the both ends in the upper surface view. By such a configuration, large stress imposed on the both ends of the separate main cutting edge 411' can be dispersed. That is, it is possible to enhance cutting strength on the both ends of the separate main cutting edge 411'. Therefore, it is possible to reduce chipping of the cutting edge.

The two curved cutting edge portions 411'A and 411'A of the separate main cutting edge 411' have an arc shape in the upper surface view. Thereby, an effect of dispersing the stress is enhanced.

In the case where the two curved cutting edge portions 411'A and 411'A are formed in an arc shape in the upper surface view, the following relationship is preferable obtained. That is, when one of the two curved cutting edge portions 411'A and 411'A positioned on the side near the corner cutting edge 43 serves as a curved cutting edge portion 411'A1 and the other serves as a curved cutting edge portion 411'A2, curvature radius R1 of the curved cutting edge portion 411'A1 is preferable larger than curvature radius R2 of the curved cutting edge portion 411'A2. That is, the curvature radius R1 and R2 preferable satisfy the relationship of R1>R2. Thereby, it is possible to substantially uniform a contact length with a work material on the both ends of the separate main cutting edge 411'. Therefore, it is possible to stabilize the discharging direction of the chip generated by the separate main cutting edge 411'. The following are more detailed reasons.

As mentioned above, in the groove portion 5, the side wall surfaces 5a and 5b are substantially parallel to the auxiliary cutting edge 42. Therefore, angles between the both ends of the separate main cutting edge 411' of the main cutting edge 41 making an obtuse angle to the auxiliary cutting edge 42 and the side wall surfaces 5a and 5b of the groove portion 5 respectively are different from each other. That is, the end of the separate main cutting edge 411' positioned on the side near the corner cutting edge 43 is connected so as to make an obtuse angle to the side wall surface 5b of the groove portion 5. Meanwhile, the other end of the separate main cutting edge 411' is connected so as to make an acute angle to the side wall surface 5a of the groove portion 5.

Specifically, when an angle between the main cutting edge 41 and the auxiliary cutting edge 42 is θ (the obtuse angle), the separate main cutting edge 411' is formed so that the end of the separate main cutting edge 411' positioned on the side near the corner cutting edge 43 makes the angle θ (the obtuse angle) to the side wall surface 5b of the groove portion 5. Meanwhile, the separate main cutting edge 411' is formed so that the other end of the separate main cutting edge 411' makes an angle (180 degrees−θ) (the acute angle) to the side wall surface 5a of the groove portion 5.

The angles between the separate main cutting edge 411' and the side wall surfaces 5a and 5b of the groove portion 5 respectively are angles between a hypothetical extension line X which is a straight cutting edge part among the separate main cutting edge 411' and the hypothetical extension lines Y1 and Y2 as shown in FIG. 4 respectively.

In such a way, in the present embodiment, the separate main cutting edge 411' is formed so that the both ends of the separate main cutting edge 411' make different angles from each other (the acute angle and the obtuse angle) to the side wall surfaces 5a and 5b of the groove portion 5. Therefore, in the present embodiment, the separate main cutting edge 411' and the side wall surfaces 5a and 5b of the groove portion 5 making such angles are connected to each other with the curved cutting edge portions 411'A1 and 411'A2 having the above curvature radius R1 and R2. That is, the separate main cutting edge 411' is formed so as to satisfy R1>R2.

Therefore, in comparison to a case where the curved cutting edge portions are formed in an arc shape having the same curvature radius R, since the curved cutting edge portion 411'A1 positioned on the one end making a larger angle (the obtuse angle) to the groove portion 5 is formed in an arc shape having larger curvature radius R, the contact length with the chip at the time of cutting is elongated. Meanwhile, since the curved cutting edge portion 411'A2 positioned on the other end making a smaller angle (acute angle) to the groove portion 5 is formed in an arc shape having smaller curvature radius R, the contact length with the chip at the time of cutting is shortened.

By such a configuration, it is possible to substantially uniform the contact length with the chip at the time of cutting on the both ends of the separate main cutting edge 411' making the different angles to the groove portion 5. Therefore, it is possible to substantially uniform cutting loads imposed on the both ends of the separate main cutting edge 411'. Further, the chip discharging direction on the both ends of the separate main cutting edge 411' is stabilized and the chip discharging property is improved.

In addition, the curved cutting edge portion is preferably formed so that the curvature radius R1 of the curved cutting edge portion 411'A1 positioned on the side near the corner cutting edge 43 is larger. Thereby, it is possible to more improve the cutting strength of the curved cutting edge portion 411'A1 positioned on the side near the corner cutting edge 43 on which a large cutting load is imposed. Therefore, the chipping of the cutting edge can be reduced and the tool life is improved.

Meanwhile, the groove portion 5 is formed on the flank 3 from the rake face 2 to the lower surface 6. A depth of this groove portion 5 is a depth capable of reducing the cutting resistance and not lowering strength of the insert 1. As shown in FIGS. 2 and 3(b), a depth D1 of the groove portion 5 on the lower surface 6 is smaller than a depth D2 of the groove portion 5 on the rake face 2. That is, the depth D1 and D2 of the groove portion 5 satisfy the relationship of D1>D2. Thereby, the strength of the insert 1 is improved. Therefore, it is possible to reduce breakage of the lower surface 6 of the insert 1.

It should be noted that here, the depth D1 of the groove portion 5 means a maximum size of the groove portion 5 in the direction substantially orthogonal to a border line between the lower surface 6 and the flank 3 on the lower surface 6. In the present embodiment, a size from the border line to the bottom surface 5c in the above direction on the lower surface 6 is the maximum size.

Here, the depth D2 of the groove portion 5 means a maximum size of the groove portion 5 in the direction substantially orthogonal to the main cutting edge 41 on the rake face 2. In the present embodiment, a size from the main cutting edge 41 to the bottom surface 5c in the above direction on the rake face 2 is the maximum size.

As shown in FIG. 3(a), a width W1 of the groove portion 5 on the lower surface 6 is larger than a width W2 of the groove portion 5 on the rake face 2. That is, the width W1 and W2 of the groove portion 5 satisfy the relationship of W1>W2. Thereby, the strength of the insert 1 is improved. Therefore, it is possible to reduce the breakage of the lower surface 6 of the insert 1. It should be noted that here, the width W1 and W2 of the groove portion 5 mean a maximum size of the groove portion 5 in the direction parallel to the flank 3 on the lower surface 6 and the rake face 2 respectively.

In the lower surface view, the groove portion 5 is formed in a substantially arc shape. Thereby, since edges are removed, it is possible to reduce generation of cracks.

A plurality of the groove portions 5 on the flank 3 have a larger clearance angle toward the corner cutting edge 43. Thereby, the interference with the work material is decreased and the chip discharging property is improved. It should be noted that here, the clearance angle of the groove portion 5 means an angle between a line L3 passing through the main cutting edge 41 perpendicular to the lower surface 6 and a hypothetical extension line L4 of the bottom surface 5c of the groove portion 5 as shown in FIG. 1. The hypothetical extension line L4 of the bottom surface 5c is a straight hypothetical extension line obtained by connecting a point positioned on the most inner side of the insert 1 in the bottom surface 5c on the rake face 2 and a point positioned on the most inner side of the insert 1 in the bottom surface 5c on the lower surface 6.

In the upper surface view, a plurality of the groove portions 5 have smaller depth toward the corner cutting edge 43. Thereby, on the side near the corner cutting edge 43 on which a larger cutting load is imposed, strength of the cutting edge is improved. Therefore, it is possible to reduce the chipping of the cutting edge. It should be noted that the depth of the groove portion 5 is regulated as well as the above D1 and D2.

The insert 1 further comprises a projection 20 formed so as to correspond to the separate main cutting edge 411. By such a configuration, the chip generated by the separate main cutting edge 411 is brought into contact with the corresponding projection 20 and stably curled. As a result, an effect of improving the chip discharging property is more enhanced. In more detail, in the upper surface view, the chip with the discharging direction stabilized by the groove portion 5 comprising the side wall surfaces 5a and 5b formed substantially parallel to the auxiliary cutting edge 42 is stably brought into contact with the corresponding projection 20. Thereby, since the chip is stably curled by the projection 20, it is possible to further improve the chip discharging property.

As shown in FIG. 2, the projection 20 is formed in a cusp-shaped having a symmetry axis Z in the upper surface view. The extending direction of this symmetry axis Z is substantially perpendicular to the separate main cutting edge 411. Thereby, an effect of stabilizing the chip discharging direction and improving the sward discharging property is enhanced. It should be noted that here, making the symmetry axis Z substantially perpendicular to the separate main cutting edge 411 means that both are essentially perpendicular to each other. That is, an angle between the symmetry axis Z and the separate main cutting edge 411 may be 90±2 degrees.

Here, forming the projection 20 in a cusp-shaped having the symmetry axis Z means that a shape of the projection 20 is essentially symmetrical to the symmetry axis Z. The symmetry axis Z of the projection 20 is a line connecting a front end P3 of the projection 20 with a middle point M of a maximum size of the projection 20 in parallel to the extending direction of the main cutting edge 41 in the upper surface view.

In addition to the above projection 20, the insert 1 further comprises a corner projection 21 located on the rake face 2 so as to correspond to the corner cutting edge 43. By the corner projection 21, it is possible to stably discharge the chip generated by the corner cutting edge 43, and the effect of improving the chip discharging property is more enhanced.

<Cutting Tool>

Figure 5:
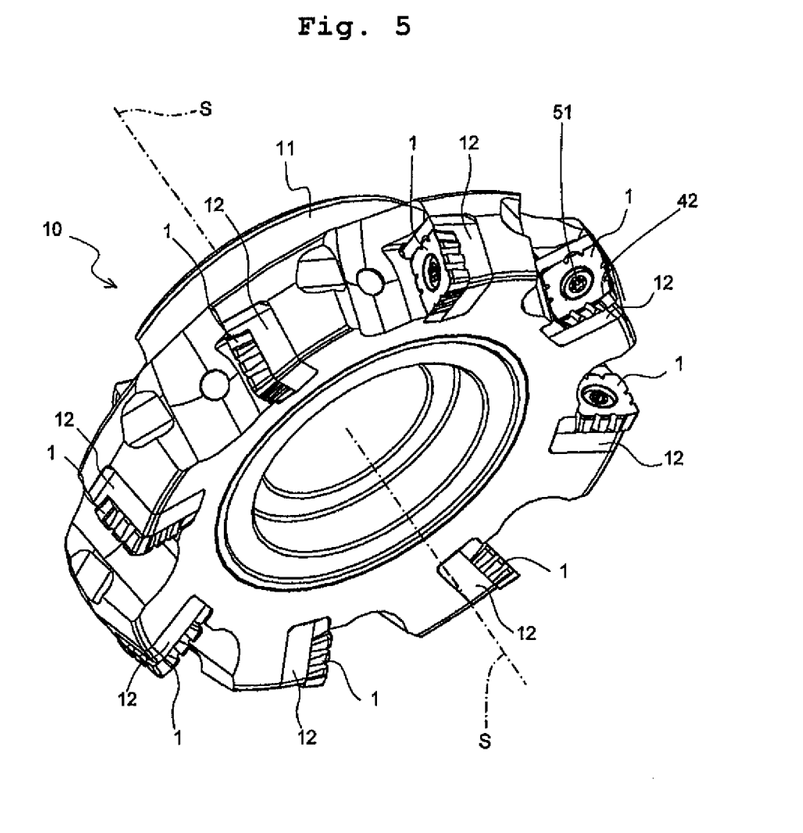
FIG. 5 is a perspective view showing a cutting tool according to one embodiment of the present invention.

Next, one embodiment of a cutting tool according to the present invention will be described with reference to FIG. 5. As shown in the drawing, in a cutting tool 10 of the present embodiment, the above insert 1 is installed in a front end of the holder 11. Specifically, the fixing screw 51 is inserted into the through hole 50 of the insert 1, and a front end of the screw 51 is screwed into a screw hole (not shown) formed in a seat portion for installing the insert of the holder 11. Thereby, the insert 1 is installed in the front end of the holder 11.

In the present embodiment, eight inserts 1 are installed in the holder 11. In the installed insert 1, the auxiliary cutting edge 42 is positioned substantially perpendicular to an axis S of the holder 11. By such a configuration, the cutting resistance is reduced, and since the insert 1 excellent in the chip discharging property is installed, it is possible to reduce holder wear generated by the chip scratching the holder 11.

Further, since the chip discharging direction is stabilized, jamming of the chip is reduced and it is possible to exert excellent work surface accuracy. It should be noted that making the auxiliary cutting edge 42 substantially perpendicular to the axis S of the holder 11 means that both are essentially perpendicular to each other. That is, an angle between the auxiliary cutting edge 42 and the axis S may be 90±2 degrees.

The insert 1 is installed in the holder 11 so as to have a positive axial rake. Thereby, the cutting resistance is further reduced. Therefore, it is possible to exert excellent cutting performance over a long time even under strict cutting conditions particularly such as heavy cutting with a large cutting amount.

Here, in the cutting tool having the positive axial rake or the cutting tool having the peripheral cutting edge angle, since a cutting edge part on the front end side of the holder is positioned on the front side in the rotation direction, a large impact is imposed on the cutting edge part. Therefore, under strict cutting conditions particularly such as the heavy cutting with a large cutting amount, the cutting edge part on the front side of the holder may be easily chipped at an earlier stage by repeating this large impact. According to the cutting tool 10, since the above insert 1 is installed, it is possible to improve strength of the cutting edge part on the front end side of the holder 11 on which the large impact is imposed. Therefore, the cutting tool 10 can exert excellent cutting performance even in the heavy cutting.

A seat member 12 is placed between the insert 1 and the holder 11. By such a configuration, it is possible to reduce damage on the holder 11 in a case where the insert 1 may be chipped. Therefore, it is possible to elongate the life of the holder 11. That is, the cutting performance is improved by exchanging not the holder 11 having large volume but the seat member 12 having relatively small volume. Therefore, working efficiency is improved and working cost is reduced.

<Cutting Method>

Figure 6:
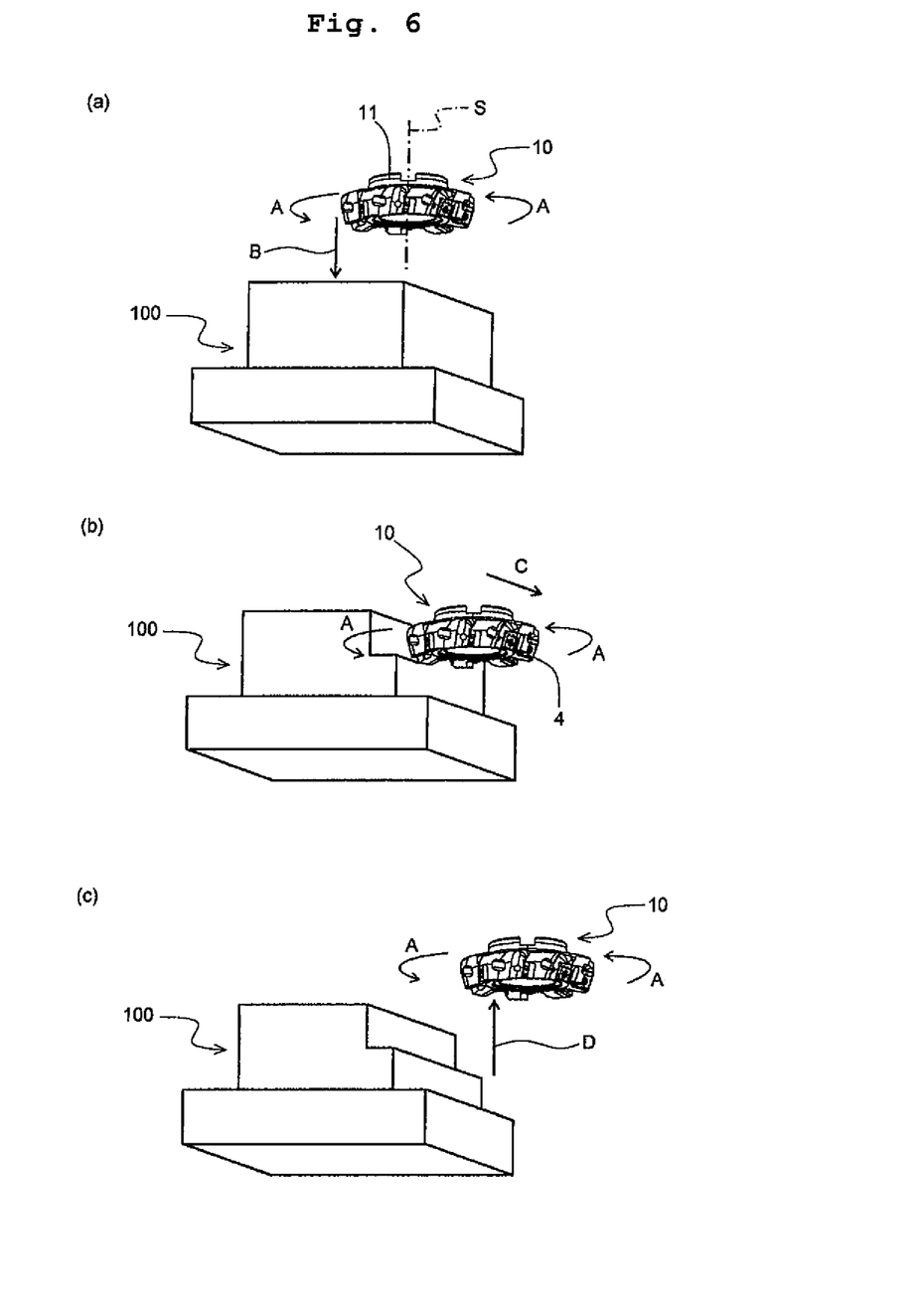

Next, one embodiment of a cutting method according to the present invention will be described with reference to FIGS. 6(a) to 6(c). The cutting method of the work material according to the present embodiment comprises the following (i) to (iii): (i) as shown in FIG. 6(a), rotating the cutting tool 10 around the axis S of the holder 11 in the arrow A direction and moving the cutting tool 10 in the arrow B direction so as to bring the cutting tool 10 close to a work material 100; (ii) as shown in FIG. 6(b), bringing the cutting edge 4 of the insert 1 into contact with a surface of the work material 100 and moving the cutting tool 10 in the arrow C direction so as to cut the work material 100; and (iii) as shown in FIG. 6(c), moving the cutting tool 10 in the arrow D direction so as to detach the cutting tool 10 from the work material 100.

Thereby, an excellent chip discharging property is obtained, and since the cutting tool 10 having the long tool life is used for the work, work efficiency and machined surface accuracy are improved.

It should be noted that in the above step (i), at least one of the cutting tool 10 and the work material 100 may be rotated. The cutting tool 10 and the work material 100 are relatively close to each other, for example, the work material 100 may be brought close to the cutting tool 10. Similarly, in the above step (iii), the work material 100 and the cutting tool 10 are relatively away from each other, for example, the work material 100 may be brought away from the cutting tool 10. In a case where the cutting is continued, a state that the cutting tool 10 and/or the work material 100 is rotated is maintained and a step of bringing the cutting edge 4 of the insert 1 into contact with different points of the work material 100 is repeated. When the cutting edge in use is worn away, the insert 1 is rotated around a center axis of the through hole 50 by 90 degrees, and an unused cutting edge is used.

The preferred embodiments of the present invention are shown above as an example. However, the present invention is not limited to the above embodiments. For example, in the above embodiment, the insert of the four-corner specification in which the main body has a square plate shape is shown as an example. However, the present invention is not limited to this, but the main body may have other shapes such as a rhomb and a triangle in the upper surface view. With a plural-corner specification, the work cost is reduced.

In the above embodiment, a case where the side wall surface 5a of the groove portion 5 positioned on the side near the corner cutting edge 43 is formed substantially parallel to the auxiliary cutting edge 42 in the upper surface view is described. However, the side wall surface 5a may come close to the auxiliary cutting edge 42 toward the inside of the groove portion. Here, the side wall surface 5a coming close to the auxiliary cutting edge 42 means that a distance between the side wall surface 5a on the side near the bottom surface 5c and the auxiliary cutting edge 42 is shorter than a distance between the side wall surface 5a on an opening of the groove portion and the auxiliary cutting edge 42. A length between the side wall surface 5a on the side near the bottom surface 5c and the auxiliary cutting edge 42 can be an arbitrary length unless the strength of the insert is lowered.

In the above embodiment, a case where the side wall surface 5b facing the side wall surface 5a is formed substantially parallel to the auxiliary cutting edge 42 in the upper surface view is described. However, the side wall surface 5b may be formed so as to come away from the auxiliary cutting edge 42 toward the inside of the groove portion. Here, the side wall surface 5b coming away from the auxiliary cutting edge 42 means that a distance between the side wall surface 5b on the side near the bottom surface 5c and the auxiliary cutting edge 42 is longer than a distance between the side wall surface 5b on the opening of the groove portion and the auxiliary cutting edge 42.

In the above embodiment, a case where the number of the groove portion is two is described. However, the number of the groove portion can be arbitrarily selected normally within a range from about 2 to 6, preferably 2 to 4 for not lowering the strength of the insert but reducing the cutting resistance.

The invention claimed is:

1. A cutting insert, comprising:
an upper surface;
a lower surface;
a side surface;
a cutting edge comprising a main cutting edge, an auxiliary cutting edge arranged so as to make an obtuse angle to the main cutting edge in the upper surface view, and a corner cutting edge positioned between the main cutting edge and the auxiliary cutting edge, the cutting edge being located in at least a part of an intersection portion between the upper surface and the side surface; and
a groove portion located on the side surface corresponding to the main cutting edge so as to reach the upper surface and comprising a first side wall surface positioned on the side near the corner cutting edge, wherein
the first side wall surface is substantially parallel to the auxiliary cutting edge or comes close to the auxiliary cutting edge toward inside of the groove portion in the upper surface view,
the main cutting edge comprises a plurality of separate main cutting edges divided by the groove portion, and
the separate main cutting edge comprising both ends connected to the groove portions among a plurality of the separate main cutting edges comprises two curved cutting edge portions on the both ends in the upper surface view,
the two curved cutting edge portions of the separate main cutting edge comprise a first curved cutting edge portion on the side near the corner cutting edge and a second curved cutting edge and have substantially arc shapes in the upper surface view, and
curvature radius of the first curved cutting edge portion is larger than curvature radius of the second curved cutting edge portion.

2. The cutting insert according to claim 1, wherein
the groove portion further comprises a second side wall surface facing the first side wall surface and the second side wall surface is substantially parallel to first side wall surface in the upper surface view, and
the first side wall surface and the second side wall surface are inclined to the main cutting edge in the upper surface view.

3. The cutting insert according to claim 1, wherein
the groove portion is located on the side surface from the upper surface to the lower surface, and
a depth of the groove portion on the lower surface is smaller than a depth of the groove portion on the upper surface.

4. The cutting insert according to any claim 1, wherein
a width of the groove portion on the lower surface is larger than a width of the groove portion on the upper surface.

5. The cutting insert according to claim 1, wherein
the groove portion has a substantially arc shape in the lower surface view.

6. The cutting insert according to claim 1, further comprising:
a projection corresponding to the separate main cutting edge.

7. The cutting insert according to claim 6, wherein
the projection has a cusp-shape having a symmetry axis in the upper surface view, and
the extending direction of the symmetry axis is substantially perpendicular to the separate main cutting edge.

8. A cutting tool, comprising:
a holder; and
the cutting insert according to claim 1 installed in a front end of the holder, wherein
the auxiliary cutting edge of the cutting insert is positioned substantially perpendicular to an axis of the holder.

9. The cutting tool according to claim 8, wherein
the cutting insert is installed in the holder so as to have a positive axial rake.

10. A cutting method of a work material, comprising:
rotating at least one of the cutting tool according to claim 8 and the work material so as to bring the work material and the cutting tool close to each other;
bringing the cutting edge of the cutting tool into contact with a surface of the work material so as to cut the work material; and
detaching the cutting tool from the work material.

11. A cutting insert, comprising:
an upper surface;
a lower surface;
a side surface;
a cutting edge comprising a main cutting edge, an auxiliary cutting edge arranged so as to make an obtuse angle to the main cutting edge in the upper surface view, and a corner cutting edge positioned between the main cutting edge and the auxiliary cutting edge, the cutting edge being located in at least a part of an intersection portion between the upper surface and the side surface; and a groove portion located on the side surface corresponding to the main cutting edge so as to reach the upper surface and comprising a first side wall surface positioned on the side near the corner cutting edge, wherein the first side wall surface is substantially parallel to the auxiliary cutting edge or comes close to the auxiliary cutting edge toward inside of the groove portion in the upper surface view a plurality of the groove portions are located on the side surface and comprise a first groove portion and a second groove portion, which lies next to the first groove portion and is closer to the corner cutting edge than the first groove portion, and a clearance angle of the second groove portion is larger than a clearance angle of the first groove portion.

12. A cutting tool, comprising:
a holder; and
the cutting insert according to claim 11 installed in a front end of the holder, wherein
the auxiliary cutting edge of the cutting insert is positioned substantially perpendicular to an axis of the holder.

13. The cutting tool according to claim 12, wherein
the cutting insert is installed in the holder so as to have a positive axial rake.

14. A cutting method of a work material, comprising:
rotating at least one of the cutting tool according to claim 12 and the work material so as to bring the work material and the cutting tool close to each other;
bringing the cutting edge of the cutting tool into contact with a surface of the work material so as to cut the work material; and
detaching the cutting tool from the work material.

15. A cutting insert, comprising:
an upper surface;
a lower surface;
a side surface;
a cutting edge comprising a main cutting edge, an auxiliary cutting edge arranged so as to make an obtuse angle to the main cutting edge in the upper surface view, and a corner cutting edge positioned between the main cutting edge and the auxiliary cutting edge, the cutting edge being located in at least a part of an intersection portion between the upper surface and the side surface; and a groove portion located on the side surface corresponding to the main cutting edge so as to reach the upper surface and comprising a first side wall surface positioned on the side near the corner cutting edge, wherein the first side wall surface is substantially parallel to the auxiliary cutting edge or comes close to the auxiliary cutting edge toward inside of the groove portion in the upper surface view a plurality of the groove portions are located on the side surface and comprise a first groove portion and a second groove portion, which lies next to the first groove portion and is closer to the corner cutting edge than the first groove portion, and a depth of the second groove portion is smaller than a depth of the first groove portion in the upper surface view.

16. A cutting tool, comprising:
a holder; and
the cutting insert according to claim 15 installed in a front end of the holder, wherein
the auxiliary cutting edge of the cutting insert is positioned substantially perpendicular to an axis of the holder.

17. The cutting tool according to claim 16, wherein
the cutting insert is installed in the holder so as to have a positive axial rake.

18. A cutting method of a work material, comprising:
rotating at least one of the cutting tool according to claim 16 and the work material so as to bring the work material and the cutting tool close to each other;
bringing the cutting edge of the cutting tool into contact with a surface of the work material so as to cut the work material; and
detaching the cutting tool from the work material.

* * * * *